(12) United States Patent
Payne

(10) Patent No.: US 8,291,635 B2
(45) Date of Patent: Oct. 23, 2012

(54) STRIKE-SETTING ASSEMBLY FOR USE WITH AN UNMANNED FISHING ROD

(76) Inventor: Lynn G. Payne, Trenton, UT (US)

( * ) Notice: Subject to any disclaimer, the term of this patent is extended or adjusted under 35 U.S.C. 154(b) by 184 days.

(21) Appl. No.: 12/914,447

(22) Filed: Oct. 28, 2010

(65) Prior Publication Data

US 2012/0102812 A1 May 3, 2012

(51) Int. Cl.
*A01K 91/10* (2006.01)
*A01K 97/10* (2006.01)
*A01K 97/11* (2006.01)

(52) U.S. Cl. ... 43/15; 43/16; 43/17; 43/17.2; 292/251.5; 24/303

(58) Field of Classification Search ............... 43/15, 16, 43/17, 17.2, 4, 18.1 R, 21.2; 24/303; 292/251.5
See application file for complete search history.

(56) References Cited

U.S. PATENT DOCUMENTS

| | | | |
|---|---|---|---|
| 2,824,404 A * | 2/1958 | Booth | 43/15 |
| 3,686,785 A | 8/1972 | Dixon | |
| 4,091,558 A * | 5/1978 | Dethlefs | 43/15 |
| 4,332,099 A * | 6/1982 | Morehead | 43/15 |
| 4,522,572 A | 6/1985 | Hahn | |
| 4,872,280 A * | 10/1989 | Smith | 43/15 |
| 5,495,688 A * | 3/1996 | Sondej et al. | 43/16 |
| 5,809,684 A | 9/1998 | Carter | |
| 6,430,864 B1 * | 8/2002 | Thomure et al. | 43/15 |
| 6,751,900 B1 | 6/2004 | Paulson | |
| 7,178,284 B2 | 2/2007 | Chamberlain | |
| 7,503,140 B2 * | 3/2009 | Polzin | 43/15 |
| 2006/0064918 A1 * | 3/2006 | Schnur | 43/15 |
| 2007/0130818 A1 * | 6/2007 | Green | 43/15 |

* cited by examiner

*Primary Examiner* — Kimberly Berona
*Assistant Examiner* — Marc Burgess
(74) *Attorney, Agent, or Firm* — Connie R. Masters

(57) ABSTRACT

A strike-setting assembly for an unmanned fishing rod including a hook-setting device carried by a fishing pole holder is provided. The hook-setting device includes a tether and an efficient, reliable mechanical trigger assembly including multiple magnets that permit easy, sensitive, multiple adjustments in multiple increments. The fishing pole holder is suitable for retaining the hook-setting device and for holding the rod in a manner providing resistance to the upward tension on the back handle portion of the fishing rod applied by the hook-setting device engaged on the front of the fishing rod.

13 Claims, 6 Drawing Sheets

STRIKE-SETTING ASSEMBLY FOR USE WITH AN UNMANNED FISHING ROD

FIELD OF THE INVENTION

The present invention relates generally to a strike-setting assembly for use with an unmanned fishing rod including a hook-setting device carried by a fishing pole holder, and more particularly, to a hook-setting device having a trigger assembly using multiple magnets to provide adjustable trigger sensitivity.

BACKGROUND INFORMATION

The fishhook-setting technique generally used by fishermen is a manual quick jerk of the fishing rod when a fish strikes (takes the baited hook or lure). This allows a quick, secure set of the hook, before the fish can spit it out or before the fish can deeply swallow it. If the fish is able to disengage from the hook, it escapes unhooked. If the hook becomes embedded in the stomach or gills, injury to the fish is increased—especially undesirable in catch-and-release fishing. Less injury occurs when the fish is hooked in the lip, jaw or cheek area, such as when the hook is set quickly.

However, at times the manual quick jerk hook-setting technique is undesirable or difficult. For instance, the fisherman may temporarily leave the rod unmanned, such as when using multiple rods, when stepping away momentarily, or when distracted. If the rod is unmanned, a tentative bite may not set the hook. The strike-setting assembly of the present invention enables an unmanned rod to quickly and efficiently set the hook, plus advantageously supplies a choice of trigger sensitivities for differing fishing environments, including locations, weather conditions, and sizes of fish.

The general idea of setting the hook with an automatic hook-setting device is known in the art. Some of the prior art hook-setting devices make use of a tether to bow the rod and a mechanical trigger to release the rod-bending cord. However, problems occur with the hook-setting devices of the prior art. These problems include awkward setup; multiple or unattached parts that can become separated and lost; relatively large size causing inconvenience in use, storage and transport; inconvenient attachment to the rod, thus interfering with retrieval of the fish from the water; lack of mechanical dependability; and lack of adjustability to match the fishing environment, thus resulting in lost fish. Some are incorporated into a proprietary fishing pole, thus precluding use with the fisherman's current set of poles.

Accordingly, there is an established need for an easy-to-set, highly adjustable, strike-setting assembly for use with an unmanned conventional fishing rod that enables a quick and efficient setting of the hook.

SUMMARY OF THE INVENTION

The present invention is directed to a strike-setting assembly for use with an unmanned conventional fishing rod, which includes a hook-setting device carried by a fishing pole holder. The hook-setting device includes a tether and an efficient, reliable mechanical trigger assembly including multiple magnets that permit easy, sensitive, multiple adjustments in multiple increments. The fishing pole holder is suitable for retaining the hook-setting device and for holding the rod in a manner providing resistance to the upward tension on the back handle portion of the fishing rod applied by the hook-setting device engaged on the front of the fishing rod, which bows the rod.

An object of the present invention is to provide a strike-setting assembly for use with an unmanned conventional fishing rod that automatically sets the hook into the mouth area of a fish without intervention by the fisherman.

A further object of the present invention is to provide a strike-setting assembly for use with an unmanned conventional fishing rod that is variably and incrementally adjustable to provide the desired trigger resistance.

Another object of the present invention is to provide a hook-setting device that is mechanically reliable.

An additional object of the present invention is to provide a strike-setting assembly that is useful in all fishing environments, including ice fishing, boat fishing, and shore fishing.

A further object of the present invention is to provide a convenient fishing pole holder that supports, retains, and integrates with the hook-setting device of the present invention.

Another object of the present invention is to provide a strike-setting assembly that is useful in different water conditions and with different sizes and types of fish.

An additional object of the present invention is to provide a strike-setting assembly that is usable with a conventional fishing rod.

Yet a further object of the present invention is to provide a strike-setting assembly that allows a quick and easy installation and removal of a conventional fishing rod.

These and other objects, features, and advantages of the present invention will become more readily apparent from the attached drawings and from the detailed description of the preferred embodiments, which follow.

BRIEF DESCRIPTION OF THE DRAWINGS

The preferred embodiments of the invention will hereinafter be described in conjunction with the appended drawings, provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

Shown throughout the figures, the present invention is directed toward a strike-activated hook-setting device for quickly and efficiently setting the fishhook while the fishing pole is unmanned. The hook-setting device includes multiple magnets that allow easy, sensitive adjustments in multiple increments. The hook-setting device is attached to and carried on a fishing pole holder that supports a standard fishing rod and reel. The fishing pole holder is particularly described as configured for ice fishing, but is variable to suit the fishing location and environment, while still performing the functions of carrying the hook-setting device and supporting the rod and reel.

Figure 1:
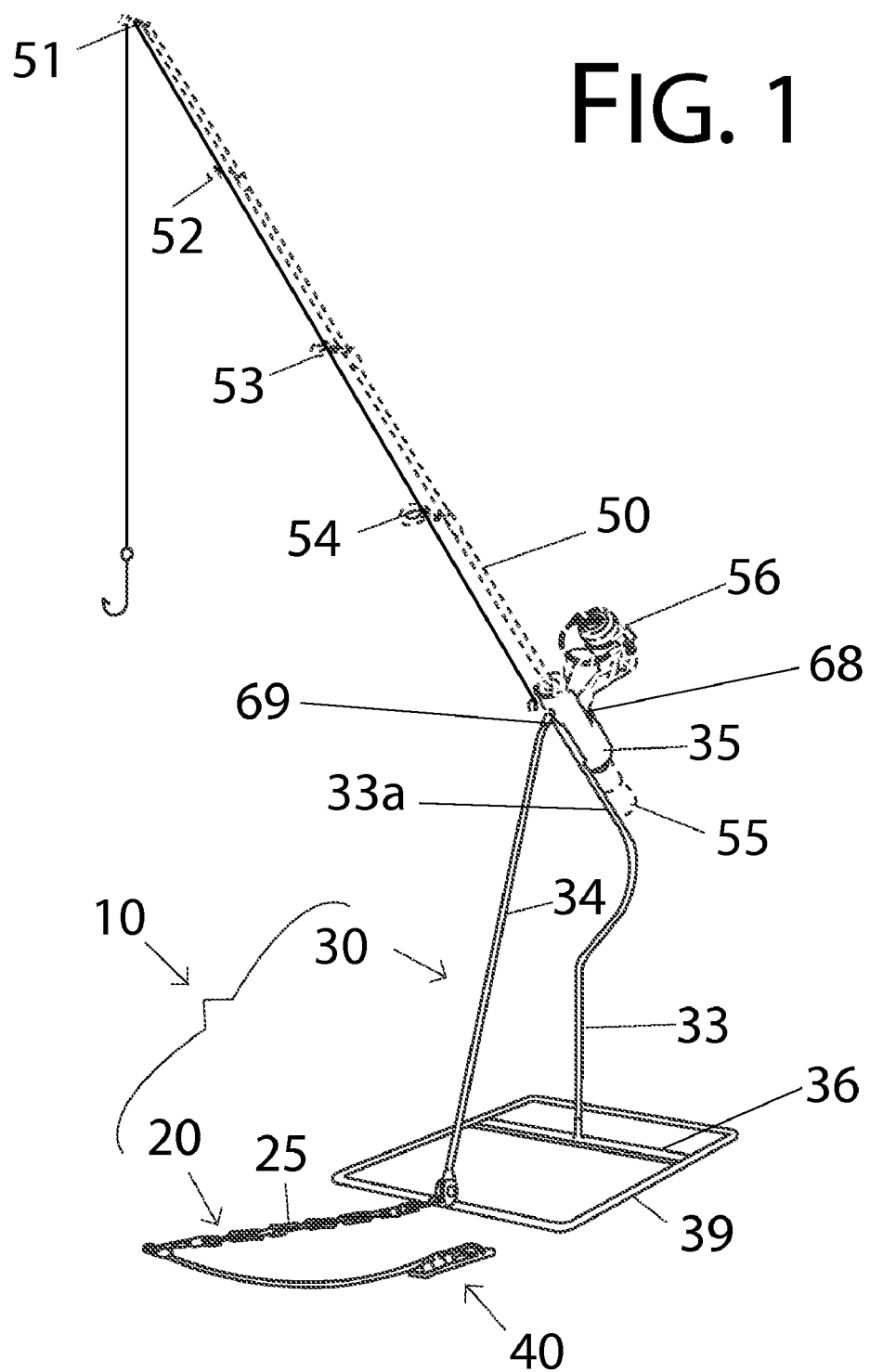
FIG. 1 is a perspective view showing a first preferred embodiment of the strike-setting assembly for use with an unmanned fishing rod of the present invention.

Referring now to FIG. 1, a hook-setting device carried by a fishing pole holder, shown generally as reference number 10, is illustrated in accordance with a first embodiment of the present invention. The hook-setting device 20 includes a tether 25 and an efficient, reliable mechanical trigger assembly 40. The fishing pole holder 30 serves as a stand for the fishing pole and includes a handle bracket 35, a base 39, and a vertical riser 33.

The fishing pole holder 30 is configured to hold and support a conventional rod 50 and reel 56. The fishing rod handle 55 is inserted into the handle bracket 35 with the rod 50 extending forward. The rod 50 is configured with multiple eyelets 51, 52, 53, 54 for retaining the fishing line.

The fishing pole holder 30 comprises a stable base 39, a vertical riser 33, 34, and a handle bracket 35. Base 39 and risers 33, 34 may preferably be formed of sturdy wire, as shown, or may be formed of other materials having sufficient strength and durability to perform their respective functions.

Base 39 is configured to provide stability to the fishing pole holder 30 and to the hook-setting device 20 during activation and during use. The fishing pole holder 30 of the first embodiment is configured for ice fishing, so the base 39 extends sufficiently to both sides and forward and backward to provide a sturdy foundation. Base 39 may be generally rectangular with a center brace 36, as illustrated; however, the particular design may be varied to include other geometric shapes and abstract shapes.

Additionally, one or more base-securing devices may be used to secure the base 39 to the horizontal surface upon which the hook-setting device carried by a fishing pole holder 10 of the present invention will be used. For instance, when used for ice fishing, the base-securing device may be one or multiple brackets fastened over the base 39, which may be hammered into the ice across one or more of the horizontal members of base 39. The base-securing device may include other removably installed devices, such as screwed anchors and stakes, and may include permanently installed devices, as discussed later in relation to FIG. 9. The primary vertical riser 33 and the secondary vertical riser 34 are securely attached to base 39. They elevate the handle bracket 35 sufficiently to allow the hook-setting device 20 to create an arch in rod 50. Vertical riser 33 has an angled portion 33a. The angled portion 33a of vertical riser 33 allows the two vertical risers 33, 34 to meet, generally forming an "R" shape with the angled portion 33a forming the top loop of the "R" and with the secondary vertical riser forming the vertical stroke of the "R."

The forward, secondary vertical riser 34 may optionally be hinged at the lower end to facilitate transport and storage. If secondary vertical riser 34 is hinged, the opposing upper end is received into a receiver 69 and may be frictionally engaged or held by a restraining mechanism, such as a restraint bar, loop, latch, or the like. Optionally, additional risers may be added or the main vertical riser 33 can be reinforced and secondary vertical riser 34 can be eliminated. Further, while fulfilling the function of elevating the handle bracket 35 and securing the hook-setting device 20, the riser or risers may take any of a variety of imaginative, fanciful, geometric, or abstract shapes; additional risers may also be added. For instance, instead of the utilitarian design illustrated, the risers could be formed of three fish, two rising vertically at an angle from base 39 and the third fish angled similarly to angled portion 33a and supporting the handle bracket 35.

The handle 55 is received by and supported by handle bracket 35. The handle bracket 35 also functions to restrain the rearward handle 55 against the tension applied to the forward portion of rod 50 by the hook-setting device 20. The handle bracket 35 may be generally cylindrical with a reel cutout 68 configured to allow the handle 55 to slip further downward into the handle bracket 35 with reel cutout 68 receiving the reel 56. The handle bracket 35 may be formed of metal, plastic, or other material having sufficient strength to support the weight of the rod and to retain the handle 55 when tension is applied by hook-setting device 20. The handle bracket 35 is securely fastened to the angled portion 33a of the main vertical riser 33.

Figure 2:
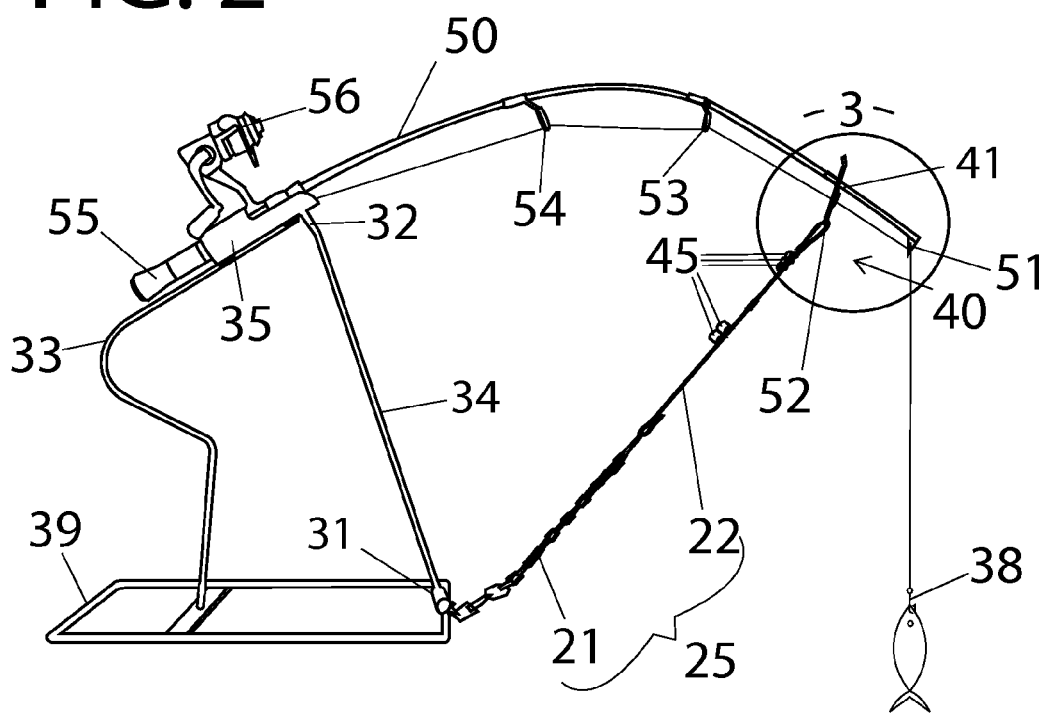
FIG. 2 is a side view of the first preferred embodiment of the strike-setting assembly of the present invention showing the hook-setting device being initialized.
Figure 3:
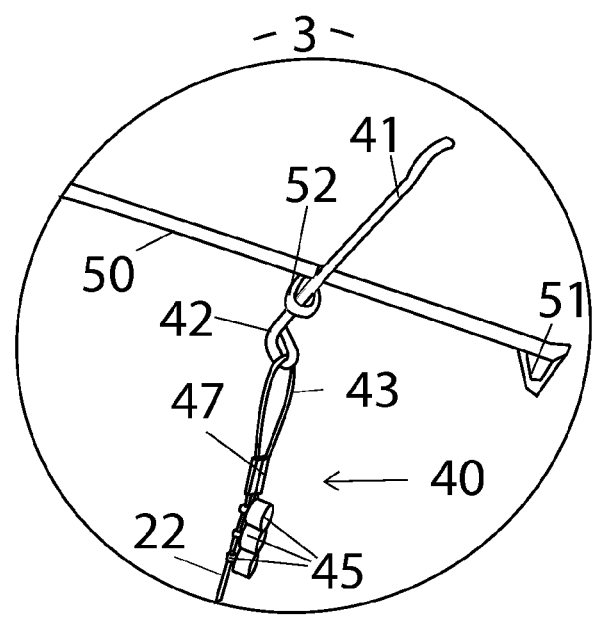
FIG. 3 is a detailed side view taken from circle -3- of FIG. 2 of the first preferred embodiment of the strike-setting assembly of the present invention showing the hook-setting device being initialized.

Turning to FIG. 2 and the detail of FIG. 3, the hook-setting device 20 carried by a fishing pole holder 30 is shown being manually initialized for use, as the trigger assembly 40 is being set. The trigger assembly 40 includes trigger lever 41 having a distal end configured with a trigger lever hook 48 and multiple magnets 45.

The proximal end of the tether 25 is attached to a forward portion of the base 39 of fishing pole holder 30. The trigger assembly 40 is attached to the distal end of tether 25. The selected length of tether 25 controls the degree of deformation of the rod 50 when the hook-setting device is in the operable position. Thus, the selected length of tether 25 is sufficiently short so as to bend the rod 50 to store an appropriate amount of energy, yet is long enough that the rod 50 is not broken or permanently damaged. The tether 25 is attached to the fishing pole holder 30 at tether connector 31. Tether connector 31 may attach tether 25 in a removable or non-removable manner. Further tether connector 31 may optionally allow an adjustment of the length of tether 25. Tether connector 31 may be any type of coupler that can be attached to the fishing pole holder 30 and that can securely retain tether 25, such as a screw-adjustable single chain link welded to the fishing pole holder 30, an open swivel bail with a gate, a clamp, or the like.

In the first embodiment, tether 25 is illustrated as a combination of chain 21 and cord 22, but any cord, rope, line, chain, cable, or other long, slender flexible lead for connecting, or combination thereof, as is known or may become known in the art, may be used.

The multiple magnets 45 slide on the distal portion of tether 25; in the first embodiment each magnet 45 is configured with a loop which is threaded on cord 22, but, optionally, magnets 45 may be held by a separate connector, with the magnet connector providing the sliding movement along at least the distal portion of cord 22.

Magnets 45 move freely along at least the distal portion of cord 22, allowing them to be manually positioned distally or proximally, as desired to set the sensitivity of the activation. Each individual magnet 45 provides a measurable resistance. Further the location of the magnets along cord 22 when attached to trigger lever 41 (the length of the fulcrum) is proportional to the amount of resistance needed to overcome it. Therefore, both the number of individual magnets selected for engagement and the distance from the end of cord 22 determine the total resistance, thus conveniently allowing a wide variety of trigger sensitivities.

Figure 4:
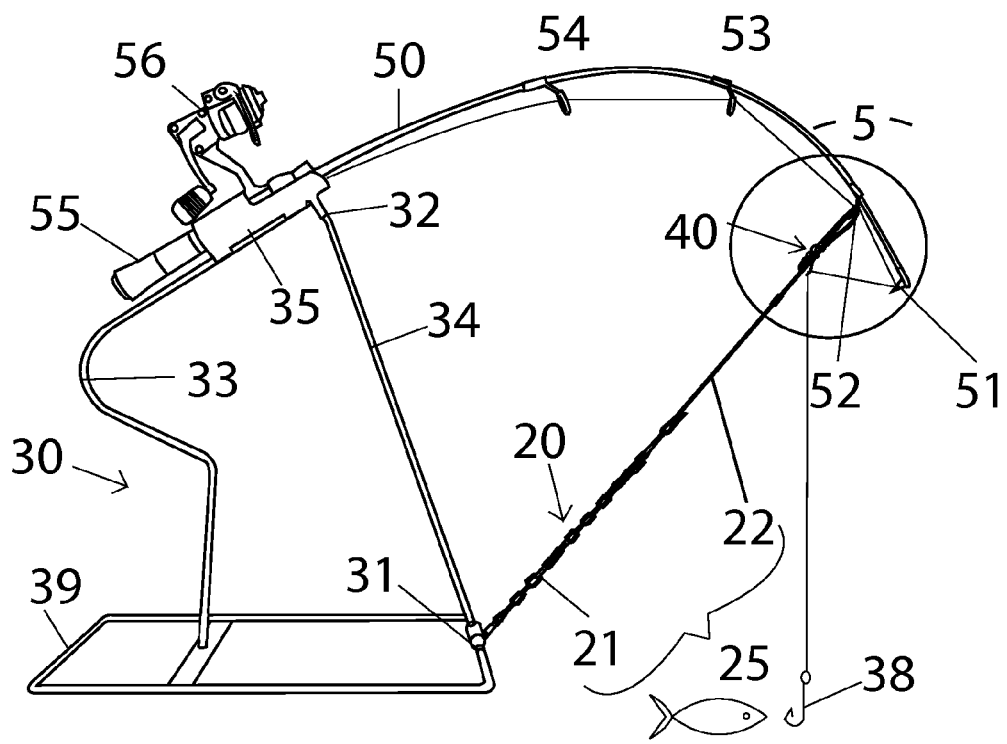
FIG. 4 is a side view of the first preferred embodiment of the strike-setting assembly of the present invention showing the hook-setting device in the operative position.
Figure 5:
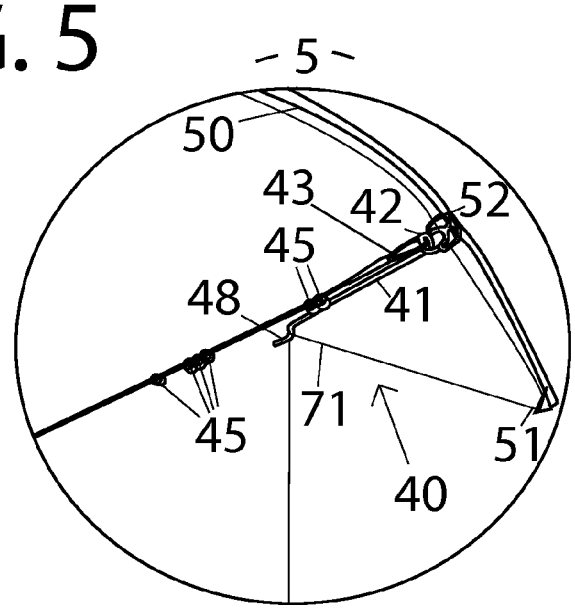
FIG. 5 is a detailed side view taken from circle -5- of FIG. 4 of the first preferred embodiment of the strike-setting assembly of the present invention showing the hook-setting device in the operative position.

The trigger lever 41 is a ferrous metal rod configured to rotate forward (as in FIG. 3) allowing manual insertion into a forward eyelet of the rod 50 and, thereafter, to rotate backward to engage one or more magnets 45 (as in FIG. 4 and FIG. 5). The trigger lever 41 is configured with trigger lever hook 48 that retains the line 71 when the trigger assembly 40 is activated. Preferably, the trigger lever 41 is configured with a device that interfaces with a cord loop 43 to permit quick rotation and effortless manipulation, such as trigger loop 42 shown in FIG. 3. To initialize the trigger assembly, the trigger lever 41 is inserted through one of the distal eyelets, such as the penultimate eyelet 52, as illustrated in FIG. 2. The use of the penultimate eyelet 52 (in contrast to the use of the end eyelet 51) may have advantages in that the arch into which the rod 50 is deformed may provide a stronger hook set due to the increased strength of the stronger portion of the rod 50 nearer the handle. Optionally, as may be appropriate in use with some rods, the trigger assembly may be attached around the rod 50 itself just above an eyelet 52 (not shown) with the eyelet 52 retaining the trigger assembly and allowing it to be set.

Other optional implementations of the strike-setting device 20, using the same functionality with differing rods or differing fishing pole holders 30 are also within the scope of the invention. For example, a specialized fishing rod may be utilized that includes a spring mechanism; upon engagement of the trigger assembly 40 into an outer eyelet 51, 52 or into a trigger receiver of the specialized rod, the fishing rod may be angled downward to compress the spring, with the release of the trigger lever 41 releasing the compressed spring and setting the hook 38. The fishing pole holder 30 can also be varied to include a spring mechanism, allowing usage of a standard rigid pole, such as a cane pole. In this instance, the trigger assembly 40 may be positioned around the rigid pole or through an outer eyelet 51, 52 with the compressed energy stored in the spring of the spring-type fishing pole holder 30. Upon the striking of the fish, the trigger lever 41 will release the compressed spring of the spring-type fishing pole holder 30, setting the hook 38.

After insertion of the trigger lever 41 through eyelet 52, the trigger lever 41 is rotated backward to be manually engaged with one or more magnets 45. The selected number of magnets 45 chosen for attaching to trigger lever 41 is inversely proportional to the sensitivity, with fewer magnets used for a more sensitive trigger. The sensitivity desired (the number of magnets used) may be based on the size (or tug strength) of the fish that is to be caught, weather conditions, water conditions, and the like. Thus the trigger assembly 40 additionally allows the fisherman to discriminate between sizes of fish desired. For example, smaller fish can be discriminated against by using a less sensitive trigger lever 41 to magnet 45 engagement (more magnets used). Three magnets 45 are illustrated as pulled forward, ready to magnetically attract lever 41, when it is rotated toward them. Thus the trigger assembly allows easy, sensitive adjustments in any of multiple increments, corresponding to the number of magnets used.

The manual bending of the rod to engage the trigger lever 41 with one or more of the magnets 45 deforms the rod with the energy for setting the strike stored in the elastic deformation of the rod. After deforming the rod, the fishing line 71 (FIG. 5) is manually engaged with or looped around trigger lever hook 48. Thus fishing line 71, after leaving eyelet 52, loops around hook 48 (with a portion retained by hook 48) and then proceeds downward to the water.

FIG. 4 and FIG. 5 show the initialized hook-setting device and fishing pole holder for an unmanned fishing rod in the operative position. A portion of fishing line 71 is looped around trigger lever hook 48. The trigger lever 41 is magnetically attached to the selected number of magnets (two are shown in FIG. 5) 45 with stored energy in the deformed rod. The distal end of fishing line 71 is in the water with the lure, bait, hook, or other device for attracting and hooking fish (herein referred to generally as "hook") positioned at the appropriate depth (not shown to scale) for the fish and the water conditions.

Figure 6:
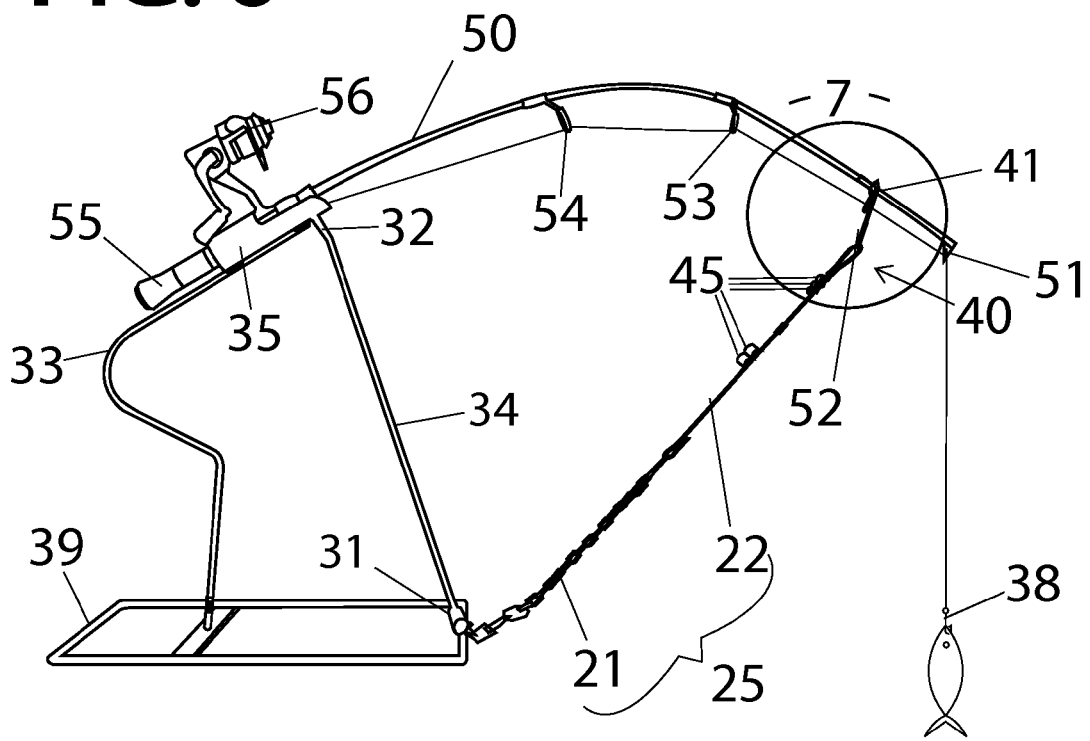
FIG. 6 is a side view of the first preferred embodiment of the strike-setting assembly of the present invention showing the hook-setting device as it is releasing.
Figure 7:
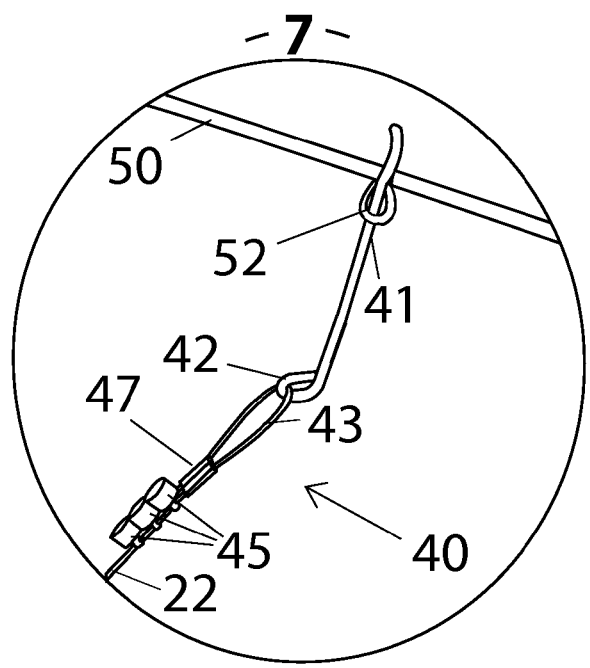
FIG. 7 is a detailed side view taken from circle -7- of FIG. 6 of the first preferred embodiment of the strike-setting assembly of the present invention showing the hook-setting device as it is releasing.

The fish approaches the hook 38; when the fish nibbles, bites, or strikes the hook 38 the hook-setting device is activated. The movement generated by the fish strike pulls downward on fishing line 71 pulling on hook 48. When hook 48 receives the tug from the strike, the trigger lever 41 is quickly released from magnets 45, rotates upward and slips backward through the eyelet 52, reversing the motion of the manual initiation of the trigger, as in FIG. 6 and FIG. 7. The release of tension results in a recoil of the rod to the relaxed, native state with the released energy setting the hook 38 into the lip area of the fish. Additionally, the change in configuration of the rod from the arched state to the native state is a strong visual signal to the fisherman of the strike. Thus the fisherman is notified of the strike and can respond quickly.

Figure 8:
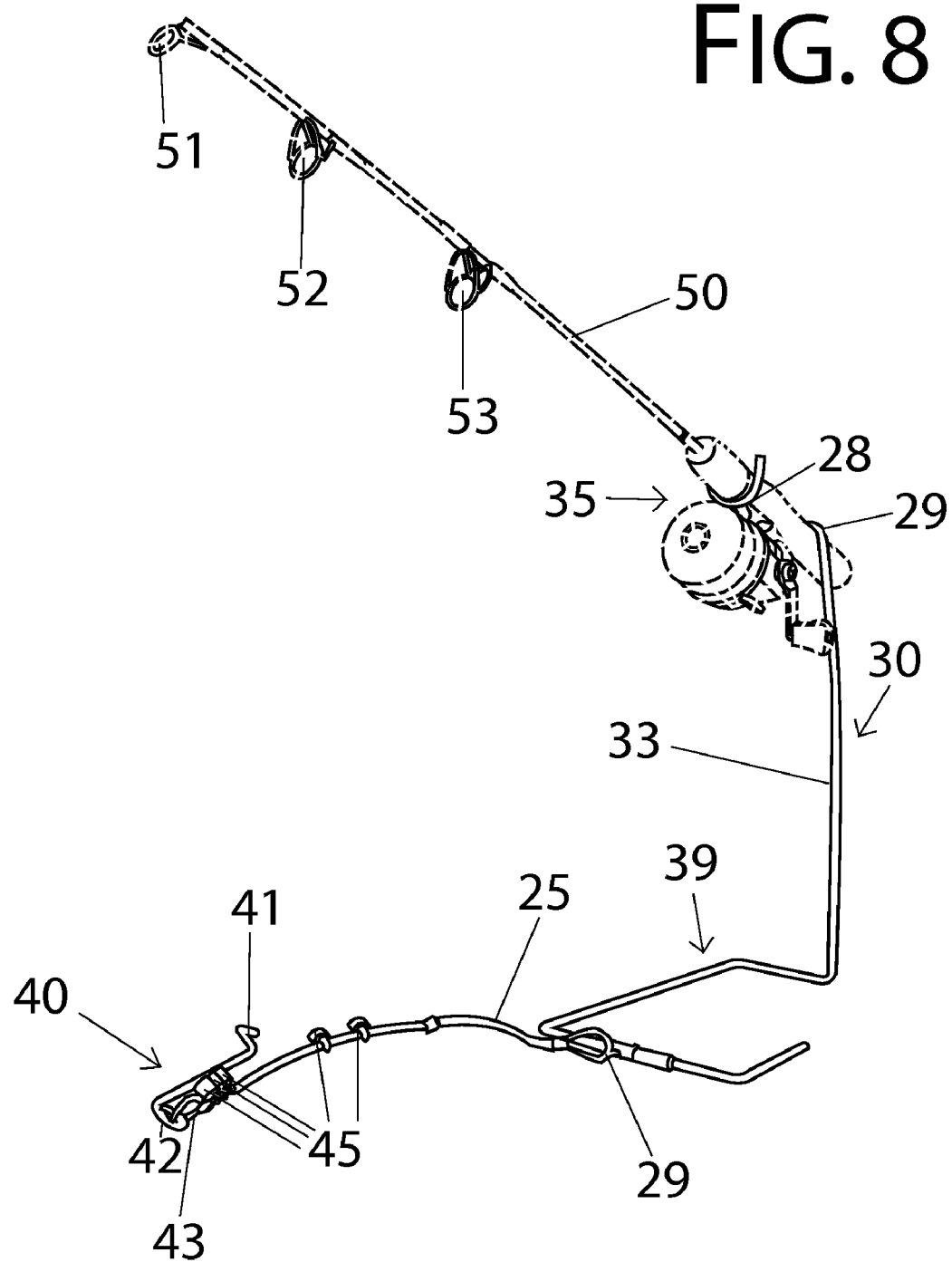
FIG. 8 is a perspective view showing a second embodiment of the strike-setting assembly for use with an unmanned fishing rod of the present invention.

FIG. 8 illustrates a second exemplary embodiment of the fishing pole holder 30 of the present invention. The fishing pole holder 30 of this second embodiment has a rectangular base 39 supporting a single vertical riser 33 that ends in an upward-facing handle bracket 35. Handle bracket 35 is a continuation of the riser 33. Sturdy wire forms base 39, riser 33 and handle bracket 35. Handle bracket 35 includes a lower support 28 for the rod and a tension-resisting top support 29. FIG. 8 also illustrates that tether 25 can be formed of a single cord 22, as opposed to the combination of chain 21 and cord 22 of the first embodiment. Both the hook-setting device 20 and the fishing pole holder 30 of the second embodiment perform the same functions as in the first embodiment.

Figure 9:
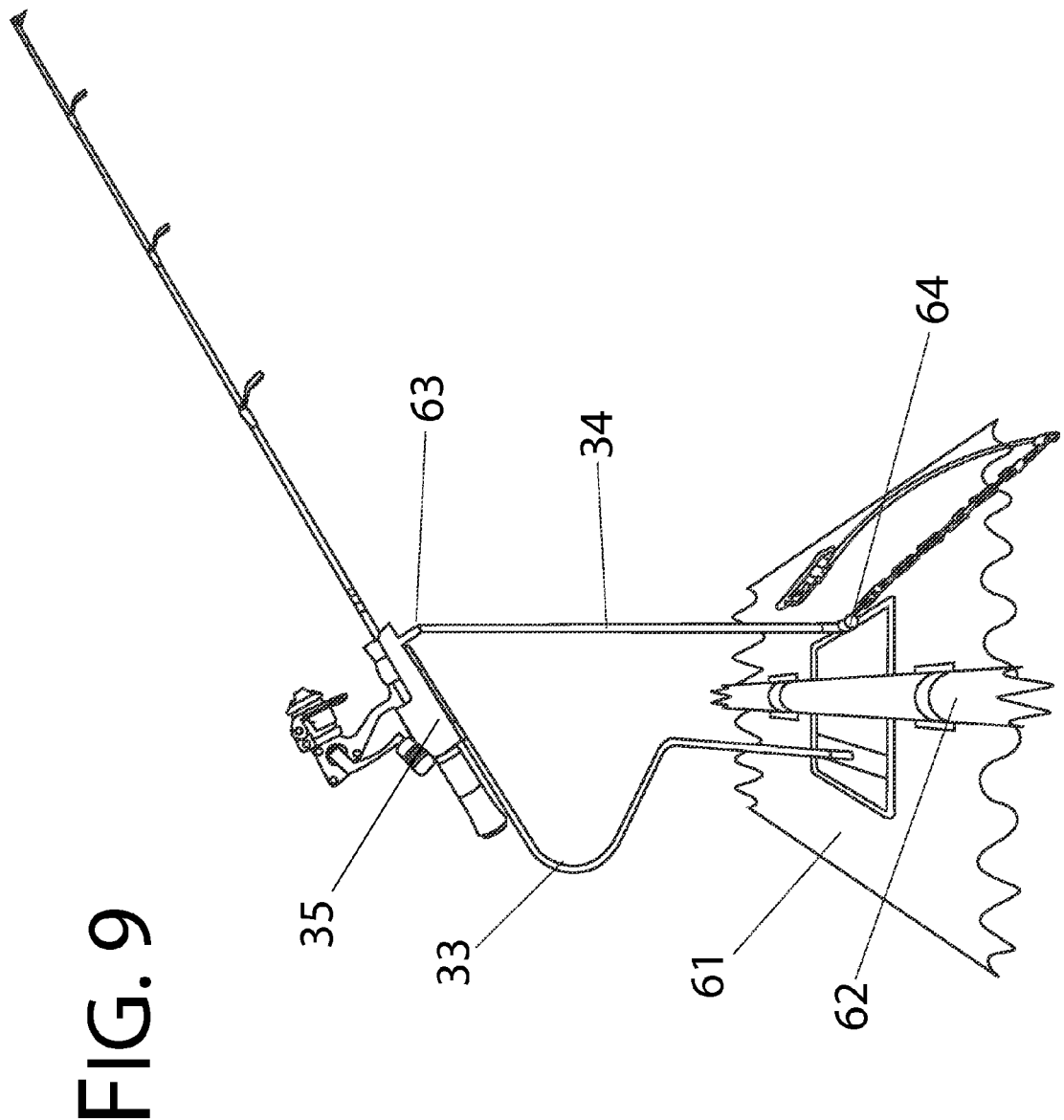
FIG. 9 is a perspective view showing a third embodiment of the strike-setting assembly for use with an unmanned fishing rod of the present invention.

FIG. 9 illustrates a third exemplary embodiment of the fishing pole holder 30 of the present invention configured for use on a boat railing, deck, dock or other boat surface 61. The fishing pole holder 30 may be permanently or removably secured to the boat surface 61. If permanently installed (not shown), a permanent base-securing device, such as bolts or screws, may be used to secure the fishing pole holder 30 securely to the surface 61 of a boat or dock; therefore, the base may be solid and/or smaller, as the permanent base-securing device would allow a firmly attached smaller base to withstand the tension produced by initiating the hook-setting device. If removably installed, latches may be used or the base 39 may be slipped under a bar 62 with the secondary vertical riser 34 then swiveled upward and engaged with a receiving bracket 63. Additional modifications to the fishing pole holder 30 may be made to suit the location of fishing. For instance, the fishing pole holder 30 of the first embodiment of FIG. 1 might be used when fishing from a steep bank, with the addition of one or two removable or integral stakes (not shown) to secure it to the ground.

To use the hook-setting device carried by a fishing pole holder 10 of the present invention, a fisherman positions base 39 of the fishing pole holder 30 on a generally horizontal surface in the proper location for the fishing environment, for example beside a hole in the ice for ice fishing or on a boat surface 61 for offshore fishing. The conventional rod 50 and reel 56 is configured with standard line and bait and/or other standard fishing elements for the particular type of fishing. The rod 50 is placed within the fishing pole holder 30 with the fishing rod handle 55 slid into the handle bracket 35. The tip of rod 50 is bent downward in an arch, allowing the trigger assembly 40 end of tether 25 to be brought near the pre-determined eyelet (generally end eyelet 51 or the penultimate eyelet 52).

The trigger lever 41 is inserted through the pre-determined eyelet, then is rotated backward to manually magnetically engage with a particular number of magnets 45. The particular number of magnets 45 selected to be engaged with lever 41 is based on the chosen trigger sensitivity desired for the fishing environment (weather conditions, water current, the type of fish, and the like). The fishing line 71 (FIG. 5) is then taken from the eyelet and manually engaged with trigger lever hook 48. The hook-setting device is then in the operative position with the optimum resistance provided by the chosen trigger sensitivity. The fisherman may then leave the rod unattended to step away or to set another hook-setting device carried by a fishing pole holder 10 of the present invention.

When the fish strikes the hook 38, the hook-setting device is activated. The line pull from the strike pulls on trigger lever hook 48, which quickly releases the trigger lever 41 from magnets 45; trigger lever 41 rotates upward and slips backward through the eyelet 52. This releases the rod to return to its native, relaxed state with the energy released setting the hook 38. The fisherman visually notices the change from the arched rod to the relaxed rod demonstrating that the strike has been set. The fisherman can quickly retrieve the fish. The strike-setting assembly of the present invention has been field-tested to detect and hook the smallest of fish under a variety of fishing conditions.

From the foregoing, it will be apparent that the strike-setting device 10 of the current invention provides ease of setting and mechanical dependability with multiple sensitive adjustments to provide the desired resistance for the fishing environment, thus efficiently and reliably setting the strike while the fishing rod is unmanned. The hook-setting device 20 is carried by a suitable fishing pole holder 30, with any of a variety of styles of fishing pole holder 30 usable with the hook-setting device 20, such as might be suitable for ice fishing, shore fishing, dock fishing, or boat fishing.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

I claim:

1. A strike-setting assembly for use with a fishing rod, comprising:
    a fishing rod holder configured to hold the handle portion of said fishing rod in a manner providing resistance to an upward tension on said handle portion;
    a tether having a distal end and a proximal end, wherein said proximal end is securely fastened to said fishing rod holder;
    a trigger lever rotatably attached to said distal end of said tether and configured with a trigger lever hook adapted to engage a fishing line; and
    multiple magnets configured to slide on at least a distal portion of said tether, wherein said trigger lever is manually insertable into an eyelet of said fishing rod and is manually rotatable to be magnetically engaged with one or more of said multiple magnets wherein, upon manually inserting said trigger lever into said eyelet and rotating said trigger lever to magnetically engage with one or more of said multiple magnets, said tether is sufficiently short to cause said fishing rod to deform to an arched shape, and also wherein the strength of the magnetic engagement of said trigger lever with one or more of said multiple magnets is configured so as to allow the striking of a hook, on a line of said fishing rod, by a fish to disengage said trigger lever from said one or more of said multiple magnets, thereby allowing said fishing rod to be transformed from the deformed state to the native, relaxed state.

2. The strike-setting assembly as recited in claim 1, wherein said tether comprises a chain disposed at said proximal end and comprises a cord disposed at said distal end upon which said multiple magnets slide.

3. The strike-setting assembly as recited in claim 1, wherein said fishing rod holder comprises a base configured to rest on a generally horizontal surface, a handle bracket configured to receive said handle portion of said fishing rod, and a primary vertical riser having a lower portion connected to said base and having an upper portion supporting said handle bracket.

4. The strike-setting assembly as recited in claim 3, wherein said fishing rod holder further comprises a secondary vertical riser having a lower portion connected to a forward portion of said base and having an upper portion connected to said upper portion of said primary vertical riser.

5. The strike-setting assembly as recited in claim 1, wherein said tether is attached to said fishing pole holder by means of a tether connector configured to allow an adjustment in the length of said tether.

6. An automatic strike-setting assembly for use with an unmanned fishing rod, comprising:
    a fishing rod holder configured to hold the handle portion of said fishing rod in a manner providing resistance to an upward tension on said handle portion, said fishing rod holder comprising a base adapted to rest upon a generally horizontal surface, a handle bracket configured to receive a handle portion of said fishing rod, a primary vertical riser having a lower portion attached to a rearward portion of said base and having an upper portion supporting said handle bracket at an angle, and a secondary vertical riser having a lower portion connected to a forward portion of said base and having an upper portion connected to said upper portion of said primary vertical riser;
    a tether having a distal end configured with a cord loop and a proximal end fastened to said fishing rod holder by a length-adjustable connector;
    a trigger lever configured with a distal trigger lever hook and a proximal lever loop, wherein said lever loop is attached to said cord loop, and wherein said trigger lever hook is adapted to removably retain a portion of a fishing line; and
    multiple magnets strung on said tether and configured to slide on at least a distal portion of said tether, wherein said trigger lever is manually insertable into an eyelet of said fishing rod and rotatable to be magnetically engaged with one or more of said multiple magnets, wherein said tether has a length sufficiently short to cause said fishing rod to deform to form an arch-shape when said trigger lever is manually inserted into said eyelet and rotated and magnetically engaged with one or more of said multiple magnets and also wherein the strength of the magnetic engagement of said trigger lever with one or more of said multiple magnets is configured so as to allow the striking of a hook, on a line of said fishing rod, by a fish to disengage said trigger lever from said one or more of said multiple magnets, thereby allowing said fishing rod to be transformed from the deformed state to the native, relaxed state.

7. A method of setting a hook in a fish, comprising:
obtaining a conventional fishing rod and reel configured with fishing line and hook;
obtaining a fishing rod holder carrying a tether with multiple magnets, wherein said tether has a proximal end securely fastened to said fishing rod holder and has a distal end configured with a rotatable trigger lever, and wherein the distal end of said trigger lever is configured with a trigger lever hook;
inserting the handle of said fishing rod into said fishing rod holder;
inserting said trigger lever through an eyelet near the forward end of said fishing rod;
sliding a selected number of said multiple magnets along said tether toward said distal end of said tether;
rotating said trigger lever approximately 180 degrees toward said selected number of said multiple magnets;
magnetically engaging said trigger lever with said selected number of said multiple magnets, wherein said fishing rod is deformed into an arch shape by the tension created by said tether;
looping said fishing line over said trigger lever hook; and
placing said hook in the water in a position in which said fish can access said hook to strike the hook, wherein, upon striking of said hook by said fish, said trigger lever is disengaged from said selected number of said multiple magnets and said trigger lever disengages from said eyelet to release said fishing rod from the deformed state providing a recoil that sets said hook into said fish.

8. The method of setting a hook in a fish, as recited in claim 7, wherein said fishing rod holder is configured to hold the handle portion of said fishing rod in a manner providing resistance to an upward tension on said handle portion.

9. The method of setting a hook in a fish, as recited in claim 7, wherein said fishing rod holder comprises a base adapted to rest upon a generally horizontal surface, a handle bracket configured to receive a handle portion of said fishing rod, and a vertical riser having a lower portion attached to a rearward portion of said base and having an upper portion supporting said handle bracket at an angle.

10. The method of setting a hook in a fish, as recited in claim 7, wherein said fishing rod holder comprises a base configured with sufficient length and width to support said fishing rod holder and said fishing rod for ice fishing.

11. The method of setting a hook in a fish, as recited in claim 7, wherein said tether includes a distal end configured with a cord loop and a proximal end fastened to said fishing rod holder by a length-adjustable connector.

12. The method of setting a hook in a fish, as recited in claim 11, wherein said trigger lever is configured with a proximal lever loop, with said lever loop attached to said cord loop.

13. The method of setting a hook in a fish, as recited in claim 7, wherein said eyelet near the forward end of said fishing rod is the penultimate eyelet.

* * * * *